May 30, 1944.  D. B. BENEDICT  2,349,807
RECOVERY OF VINYL ACETATE FROM SOLVENT MIXTURES
Filed Aug. 30, 1941
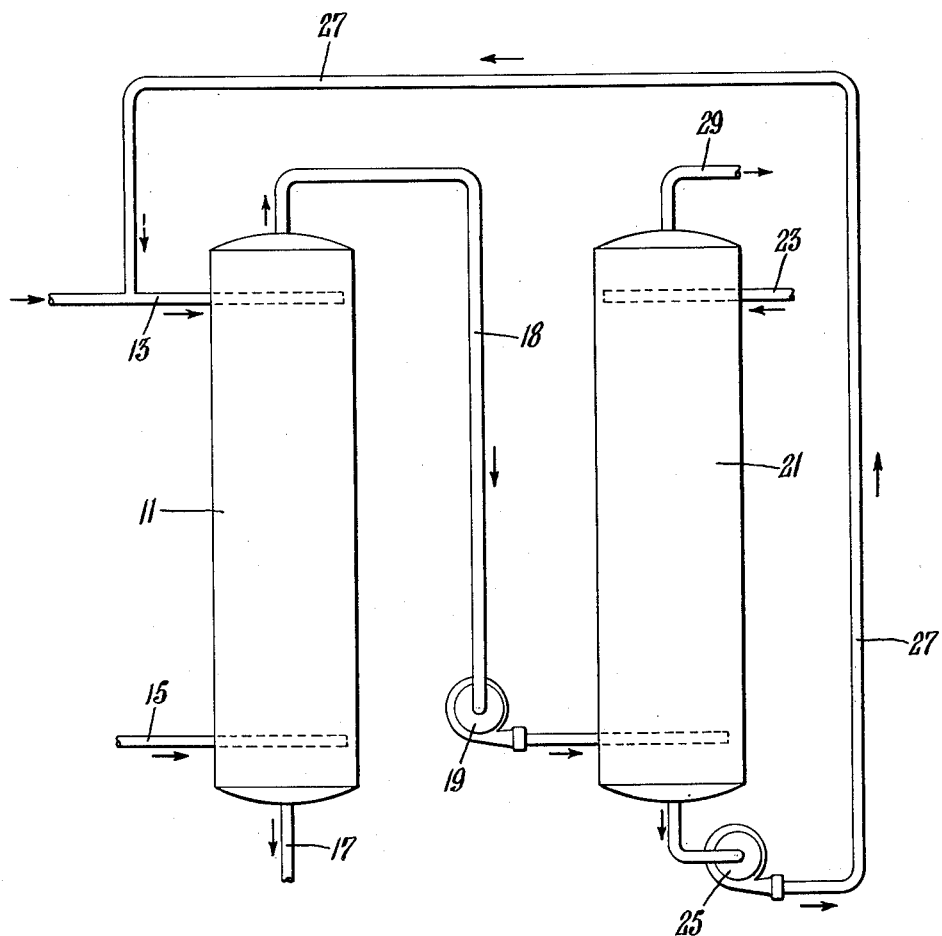
INVENTOR
DONALD B. BENEDICT
BY
ATTORNEY Patented May 30, 1944

2,349,807

UNITED STATES PATENT OFFICE 2,349,807

RECOVERY OF VINYL ACETATE FROM SOLVENT MIXTURES

Donald B. Benedict, South Charleston, W. Va., assignor to Carbide and Carbon Chemicals Corporation, a corporation of New York Application August 30, 1941, Serial No. 408,971

11 Claims. (Cl. 260—499)

The present invention relates to the recovery of vinyl esters of aliphatic acids, such as vinyl acetate, from mixtures containing such ester in conjunction with solvents therefor, either alone or in admixture with water and/or certain lower aliphatic alcohols containing not more than three carbon atoms in the molecule.

More particularly, the invention concerns the extraction of such mixtures containing one or more of such vinyl esters, utilizing a multi-stage countercurrent procedure under conditions whereby most of the vinyl ester is removed from the mixture and is recovered in sufficiently pure form for use in the production of vinyl resins, and whereby the acetone or other solvent present is recovered in pure form, or in a form sufficiently pure (and substantially free from such impurities as the lower aliphatic alcohol, water, and other impurities), that it may be used in the production of the aforesaid type of resins by well-known procedures.

The invention has special utility for the recovery of vinyl acetate, acetone and isopropanol from aqueous mixtures thereof isolated during the spray precipitation of vinyl resins, by processes such as that described in Patent No. 2,202,481, issued to Henry L. Cox and Jacob D. Matlack.

Processes for the production of copolymer vinyl resins by the conjoint polymerization of a vinyl halide with a vinyl ester of an aliphatic acid are now well known, and are described in Patents No. 1,935,577 and No. 2,064,565 of E. W. Reid. The commercial exploitation of these processes necessitates the recovery of the unreacted vinyl acetate or equivalent vinyl ester. In attempts to provide an adequate recovery of the unreacted ester, processes have been devised for spray-drying the resin in an evaporative atmosphere. Such a process is described in U. S. Patent No. 2,187,877 of Carlton R. Ferris and Estol T. Carte. The spray-drying procedure separates vinyl acetate and acetone from the vinyl resin without the addition of any new solvents. Recovery of actone and vinyl acetate from the vapors recovered during spray-drying is difficult and costly, due to the partial polymerization of the vinyl acetate in the base of the still used in separating the acetone from the vinyl acetate; and the recovered acetone is not of the best quality due to the presence of aldehydes. Moreover, because of the presence of slight amounts of catalysts in such spray-dried resins, the heat stability of the resin is not as high as is desirable where the resin is to be used for certain purposes.

It long has been known that a vinyl resin of high heat stability may be produced by mixing the autoclave varnish or acetone solution of vinyl resin with water or other precipitant. However, heretofore, the commercial utilization of such procedure has been handicapped because of the practical impossibility of recovering the solvents and unreacted vinyl acetate from the mixture of precipitants by distillation. It is very difficult to separate vinyl acetate from acetone, as there two materials have an unfavorable liquid-vapor curve. The fact that vinyl acetate must be collected in the part of the kettle housing the heating coils when distilling the aqueous precipitant mixture also is detrimental. Vinyl acetate forms a constant boiling mixture with isopropanol which is usually present in the precipitant mixture. Vinyl acetate, under such conditions, decomposes by hydrolysis with water, or by alcoholysis with the isopropanol. Both of these reactions are increased by temperatures obtained in the distillation.

The present invention overcomes the difficulties which heretofore have rendered difficult or impossible the recovery from the precipitant mixture of (1) adequately pure vinyl acetate; (2) a resin solvent; and (3) a resin precipitant.

According to one modification of the invention, the liquid mixture employed for the precipitation of the vinyl resin from the usual autoclave varnish or vinyl resin solution—and which, after such service and separation from the resin, contains water, vinyl acetate, acetone, and usually a lower aliphatic alcohol having not more than three carbon atoms in the molecule, such as isopropanol—is subjected to countercurrent extraction, in the usual type of extraction column, with a water-immiscible selective solvent or extractant for the vinyl acetate which solvent or extractant has a higher solvent capacity for vinyl acetate or other vinyl ester than for said acetone and/or alcohol, when in contact with a water phase, and more especially one in which vinyl acetate is more readily absorbed than are acetone and isopropanol.

Preferably the extractant selected has a high affinity for vinyl acetate, and has relatively low affinities for acetone and the alcohol, in relation to water. The preferred extractant has a higher boiling point than the vinyl acetate, so that the latter can be easily separated from the extractant by distillation, either at atmospheric or subatmospheric pressures. The extractant may be quite insoluble in the mixture being extracted; or any small portion of the mixture soluble therein may be readily recovered in subsequent operations. The extractant must be inert to the vinyl acetate and other liquids utilized or to be recovered.

There is withdrawn from the upper part of the aforesaid extraction column an extract containing most of the vinyl acetate. Concurrently a raffinate containing the major portion of the acetone and alcohol is withdrawn from the base of the column. The extract is introduced into the lower portion of a second extraction column in which it flows in intimate countercurrent contact with a stream of water which serves to extract the acetone and alcohol components of the first-mentioned extract. A solution of vinyl acetate in the water-immiscible extractant, and which is substantially free from acetone and isopropanol or other alcohol, is withdrawn from the upper end of the second extraction column. Concurrently, a raffinate containing the acetone and isopropanol together with extremely small amounts of vinyl acetate is withdrawn from the base of the second column and may be admixed with the mixture of precipitants being fed to the upper end of the first extraction column for treatment.

The raffinate withdrawn from the base of the first column may be continuously or intermittently conducted to stills for recovery of the acetone and alcohol contents thereof. The solution of vinyl acetate in the water-insoluble selective solvent is conducted continuously or intermittently to a still for recovery of vinyl acetate of high purity, this being readily accomplished due to the substantial absence from this solution of acetone, alcohol, and other extraneous materials. Due to the high boiling point of the selective solvent, the vinyl acetate is readily stripped from the solution by a simple distillation procedure, without injury thereto, and with minimum expense for equipment and operation.

It is preferred to employ as a selective solvent in the first extraction stage, those saturated aliphatic hydrocarbons boiling around 125° C. or above. To avoid contamination of the recovered materials, such hydrocarbons may be substantially free from sulphur, at least to the extent secured by any of the usual procedures for sulphur removal. A highly effective selective solvent is such a hydrocarbon fraction distilled from drip gasoline, and boiling between around 125° C. and around 160° C. at atmospheric pressure, which includes most of the nonanes and some decanes. Heptanes are not suitable for use since they form constant boiling mixtures with vinyl acetate. The xylenes and other aromatic hydrocarbons that do not form constant boiling mixtures with vinyl acetate may effectively be used, although these have somewhat less favorable specific gravities than the aliphatic hydrocarbons. Certain water-immiscible aliphatic ethers, such as dibutyl ether; ketones, such as diisobutyl ketone; and esters, such as 2-ethylhexyl acetate; may be used less advantageously.

In preparing the precipitant mixture for extraction by the present process, it is desirable, in order to secure the most efficient extraction of the vinyl acetate, to dilute the mixture with water where necessary to provide a mixture containing between around 55% and around 75% of water before conducting the mixture to the first extraction column. However, the process is operable at other dilutions as long as there exists separate continuous and dispersed phases in the mixture flowing in the extraction column. As the water content is decreased, the partition coefficient for vinyl acetate becomes increasingly unfavorable. However, if the liquid precipitant mixture being extracted contains more than around 70% of water, an excessive quantity of material must be handled and the subsequent distillation is more difficult.

Referring to the accompanying drawing wherein is shown diagrammatically apparatus for conducting the invention, a stream of spray-precipitant liquid containing vinyl acetate, acetone, isopropanol and water is introduced into the upper end of extraction column 11 from conduit 13 in well known manner. Concurrently, a flowing stream of the desired hydrocarbon or other selective extractant for the vinyl acetate, is introduced into the lower portion of column 11 through conduit 15 and flows upwardly in the column in intimate countercurrent contact with the descending stream of the mixture to be extracted. The raffinate from column 11 is withdrawn through conduit 17 to storage, or to continuously or intermittently operating stills for recovery of the acetone and isopropanol content. The solvent extract, enriched in vinyl acetate, and containing some acetone and isopropanol, is withdrawn from the upper end of column 11 and is conducted through conduit 18 by pump 19 and introduced into the lower end of the second extraction column 21 where it passed upwardly in intimate countercurrent contact with a flowing stream of water which may be at or around atmospheric temperature, and is introduced into the upper end of the column through conduit 23. During such contact, the water extracts substantially all of the acetone and isopropanol from the solvent solution; and the solution of acetone, isopropanol and a small amount of vinyl acetate in water is withdrawn from the base of column 21 and is conducted by pump 25 through conduit 27 to the conduit 13 for intermixture with the precipitant liquid flowing through the latter to the extraction column 11. The solution of vinyl acetate in the selective solvent is withdrawn from the upper end of column 21 through conduit 29 and conducted to a point of storage or to a still for recovery of the vinyl acetate. This distillation step may be conducted either continuously or intermittently. The residual solvent or extractant, containing less than 0.05% of vinyl acetate and substantially free from acetone and isopropanol, is reused in the process. The extraction towers 11 and 21 may be of the baffle plate type or the equivalent.

It is possible to employ a considerable range of flow ratios of selective solvent to precipitant mixture, and of water to extract from the first column in the respective extraction steps; although it is obvious that variations in the flow ratios influence the per cent extraction obtained with a given height of column, and the extraction efficiency. In general the flow ratios of extractant to aqueous mixture being treated may vary widely, depending upon the percentage of vinyl acetate or other ester which is to be removed. Likewise, the flow ratios of water to the extract solution from the first column within the second column depends upon the maximum amount of water that can be tolerated in the feed liquid entering the first column. In actual practice it is advantageous to use as much water as possible in the second column up to the point where undue dilution of the feed liquid to the first column results.

In one embodiment of the invention, the precipitant mixture and the selective solvent, in this case an aliphatic hydrocarbon mixture boiling within the range between 125° C. and 160° C., were fed to column 11 in the ratio by weight of around 3 to 1. The hydrocarbon extract from column 11 and water were continuously fed to the second extraction column 21 in the approximate proportions of 1 to 1. Under these conditions of operation, the hydrocarbon extract leaving the second column 21 through line 29 was composed of a solution of vinyl acetate in the hydrocarbon which contains around 0.01% of acetone and was substantially free from isopropanol. From this solution, simple distillation effected ready recovery of vinyl acetate of very satisfactory purity. The major portion of the acetone and isopropanol present in the liquid fed to column 11 through conduit 13 was recovered by simple distillation of the raffinite withdrawn from that column through line 17. The remainder of the acetone and isopropanol, which was present in the extract from column 11, was isolated in column 21 and returned to the first column through conduits 27 and 13. Thus, there was substantially no loss of the valuable components of the original precipitant bath or mixture formed during the spray precipitation of the vinyl resin varnish.

It is possible, by the present invention, to recover from a liquid mixture produced in the spray precipitation of vinyl resins and containing around 1% of vinyl acetate, together with large amounts of acetone, isopropanol and water, substantially all of the vinyl acetate in substantially pure form, while concurrently recovering the acetone and alcohol components in form suitable for reuse by simple distillation, with rectification, of the raffinate from the first extraction stage.

In certain instances the vinyl resin varnish mixture to be precipitated contains unreacted vinyl chloride or other vinyl halide. Such mixtures preferably are stripped of the vaporous vinyl chloride content before precipitation of the varnish mixture. Traces of the vinyl halide, when present in the precipitant mixture, however, do not interfere with the present extraction process, and follow the vinyl acetate or similar vinyl ester through the various extraction process stages.

It will be understood that the present process is applicable to the separation of vinyl acetate and similar vinyl esters not only from mixtures thereof with acetone or similar water-soluble resin solvents, but also from mixtures of such esters and solvents with water-soluble resin precipitants, such as methanol, ethanol, propanol, and isopropanol, where such alcohols are used as precipitants for vinyl resin autoclave varnishes.

I claim:

1. Process for recovering vinyl acetate from an aqueous mixture containing such ester together with a water-soluble ketone, which comprises extracting said aqueous mixture with a water-immiscible selective solvent for said vinyl acetate which has a higher solvent capacity for said vinyl acetate than for said ketone when in contact with a water phase, thereby forming an extract fraction and a raffinate fraction, said solvent being a mixture of saturated aliphatic hydrocarbons boiling above 125° C. at atmospheric pressure, separating the extract fraction from the raffinate fraction, extracting such extract fraction with water to form a second extract containing said vinyl acetate and approximately free from said water-soluble ketone, and isolating the vinyl acetate from said second extract.

2. Process for recovering vinyl acetate from an aqueous mixture containing the same together with a water-soluble lower aliphatic ketone, which comprises extracting said aqueous mixture with a water-immiscible selective solvent for the vinyl acetate, thereby forming an extract fraction and a raffinate fraction, said solvent being a hydrocarbon fraction distilled from gasoline and boiling between around 125° and around 160° C. at atmospheric pressure, separating the resultant extract fraction from the residual raffinate fraction, extracting such extract fraction with water to form a second solution of vinyl acetate in said selective solvent which is approximately free from said water-soluble ketone, and isolating the vinyl acetate from said second extract.

3. Process for recovering vinyl acetate from an aqueous mixture containing the same together with acetone and isopropanol, which comprises extracting said aqueous mixture with a water-immiscible selective solvent for the vinyl acetate which does not form a constant boiling mixture with said vinyl acetate, and which solvent has a higher solvent capacity for vinyl acetate than for acetone and isopropanol when in contact with a water phase, thereby forming an extract fraction and a raffinate fraction, said water-immiscible solvent being a mixture of saturated aliphatic hydrocarbons boiling above 125° C. at atmospheric pressure, separating the said fractions, extracting said extract fraction with water to form a second solution of vinyl acetate in the water-immiscible solvent which is approximately free from acetone and isopropanol, and isolating the vinyl acetate from said second extract.

4. Process for recovering vinyl acetate from an aqueous mixture containing the same together with acetone and isopropanol, which comprises adjusting the water content of said aqueous mixture to around 55% to 75%, extracting the resultant mixture by countercurrent contact therewith of a selective solvent for the vinyl acetate, said solvent having a higher solvent capacity for said vinyl acetate than for said acetone and said isopropanol, and being selected from the group consisting of the aliphatic and aromatic hydrocarbons boiling above around 125° C. at atmospheric pressure, thereby forming an extract fraction relatively richer in vinyl acetate and a raffinate fraction containing acetone and isopropanol, extracting the extract fraction with water, thereby forming a second extract solution containing vinyl acetate and approximately free from acetone and isopropanol, and recovering in purified form from said second extract the vinyl acetate present therein.

5. Process as defined in claim 4 wherein said water-immiscible solvent is at least one saturated aliphatic hydrocarbon boiling within the range between around 125° C. and around 160° C.

6. Process for recovering vinyl acetate from an aqueous mixture containing the same together with at least one water-soluble organic solvent and at least around 55% of water, which comprises extracting said aqueous solution with at least one saturated aliphatic hydrocarbon boiling within the range between around 125° C. and around 160° C. at atmospheric pressure, separating the resultant solution of vinyl acetate in said hydrocarbon, extracting the last-named solution with water, thereby removing water-soluble solvent from such solution and forming a second solution of vinyl acetate in said hydrocarbon in which the ratio by weight of the water-soluble solvent to vinyl acetate is very low, and recovering the purified vinyl acetate from the last-named solution.

7. Process for recovering vinyl acetate from an aqueous mixture containing the same together with at least one water-soluble organic solvent and at least around 55% of water, which comprises contacting a quantity of said aqueous solution with a smaller portion of at least one saturated aliphatic hydrocarbon boiling within the range between around 125° C. and around 160° C. at atmospheric pressure, separating from the residual raffinate the resultant solution of vinyl acetate in the said hydrocarbon, extracting the last-named solution with water, thereby extracting the water-soluble solvent from said last-named solution and forming a second solution of vinyl acetate and water-soluble solvent in said hydrocarbon, said second solution having a low ratio by weight of water-soluble solvent to vinyl acetate, and recovering purified vinyl acetate from said second solution.

8. Process for recovering vinyl acetate from an aqueous mixture containing the same together with a water-soluble aliphatic ketone, which comprises extracting said aqueous mixture with at least one saturated aliphatic hydrocarbon boiling within the range between around 125° C. and around 160° C. at atmospheric pressure, thereby forming an extract fraction and a raffinate fraction, separating the two fractions, extracting the extract fraction with water thereby forming a second extract containing said vinyl acetate and approximately free from said water-soluble ketone, and isolating the vinyl acetate from said second extract.

9. Process for recovering vinyl acetate from an aqueous mixture containing the same together with a water-soluble aliphatic ketone, which comprises extracting said aqueous mixture with an aromatic hydrocarbon boiling above 125° C. at atmospheric pressure, thereby forming an extract fraction and a raffinate fraction, separating the two fractions, extracting said extract fraction with water to form a second extract containing said vinyl acetate and approximately free from said water-soluble ketone, and isolating the vinyl acetate from said second extract.

10. Process for recovering vinyl acetate from an aqueous mixture containing the same together with a water-soluble aliphatic ketone, which comprises extracting said aqueous mixture with a xylene, thereby forming an extract fraction and a raffinate fraction, separating the two fractions, extracting said extract fraction with water to form a second extract containing said vinyl acetate and approximately free from said water-soluble ketone, and isolating the vinyl acetate from said second extract.

11. Process for recovering vinyl acetate from an aqueous mixture containing the same together with a water-soluble aliphatic ketone, which comprises extracting said aqueous mixture with a selective solvent for the vinyl acetate, said solvent being selected from the group consisting of the aliphatic and aromatic hydrocarbons boiling above around 125° C. at atmospheric pressure, thereby forming an extract fraction and a raffinate fraction, separating the two fractions, extracting the extract fraction with water, thereby forming a second extract containing said vinyl acetate and approximately free from said water-soluble ketone, and isolating the vinyl acetate from said second extract.

DONALD B. BENEDICT.